US012079966B2

(12) United States Patent
Fujino et al.

(10) Patent No.: US 12,079,966 B2
(45) Date of Patent: Sep. 3, 2024

(54) IMAGE PROCESSING DEVICE, IMAGE PROCESSING METHOD, IMAGING DEVICE, AND PROGRAM

(71) Applicant: FUJIFILM Corporation, Tokyo (JP)

(72) Inventors: Rina Fujino, Tokyo (JP); Toshiaki Nagai, Tokyo (JP); Tsuneo Sato, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 18/480,935

(22) Filed: Oct. 4, 2023

(65) Prior Publication Data

US 2024/0029212 A1 Jan. 25, 2024

Related U.S. Application Data

(63) Continuation of application No. 17/470,069, filed on Sep. 9, 2021, now Pat. No. 11,842,461, which is a
(Continued)

(30) Foreign Application Priority Data

Mar. 22, 2019 (JP) .................................. 2019-054333

(51) Int. Cl.
*G06T 5/70* (2024.01)
*G06F 3/12* (2006.01)
(Continued)

(52) U.S. Cl.
CPC ................. *G06T 5/70* (2024.01); *G06F 3/12* (2013.01); *G06T 1/0007* (2013.01); *H04N 9/643* (2013.01); *H04N 23/63* (2023.01); *H04N 23/80* (2023.01)

(58) Field of Classification Search
CPC ......... G06T 5/002; G06T 5/70; G06T 1/0007; G06F 3/12; H04N 9/643; H04N 23/63;
(Continued)

(56) References Cited

U.S. PATENT DOCUMENTS 7,539,353 B2   5/2009 Kawada
10,032,482 B2  7/2018 Yoshizawa
(Continued)

FOREIGN PATENT DOCUMENTS

CN    1607451 A    4/2005
CN    101297545 A  10/2008
(Continued)

OTHER PUBLICATIONS

International Search Report issued in PCT/JP2020/008568; mailed May 19, 2020.
(Continued)

*Primary Examiner* — Michael S Osinski
(74) *Attorney, Agent, or Firm* — Studebaker & Brackett PC

(57) ABSTRACT

An image processing device includes an image acquisition unit that acquires a captured image to be processed from a storage unit in which a captured image having first date/time information indicating a time of imaging is stored, a date/time information acquisition unit that acquires the first date/time information and acquires second date/time information indicating a date/time when the captured image to be processed is acquired, an elapsed date/time calculation unit that calculates an elapsed date/time from the time of imaging by making a comparison between the first date/time information and the second date/time information, and an image processing unit that selects image processing based on a length of the elapsed date/time from among a plurality of kinds of image processing that change according to the length of the elapsed date/time and performs the selected image processing on the captured image to be processed.

20 Claims, 16 Drawing Sheets

Related U.S. Application Data continuation of application No. PCT/JP2020/008568, filed on Mar. 2, 2020.

(51) Int. Cl.
  *G06T 1/00* (2006.01)
  *H04N 9/64* (2023.01)
  *H04N 23/63* (2023.01)
  *H04N 23/80* (2023.01)

(58) Field of Classification Search
  CPC .... H04N 23/80; H04N 1/00188; H04N 23/60; H04N 2201/0084; H04N 2201/3214; H04N 2201/3215; H04N 2201/3271; H04N 2201/3273; H04N 2201/3274; H04N 1/32128; H04N 5/93; H04N 1/00912; H04N 21/4335; H04N 21/44008; H04N 21/4402; G06V 10/454; G06V 10/811; G06V 10/82
  See application file for complete search history.

(56) References Cited

U.S. PATENT DOCUMENTS

| | | | |
|---|---|---|---|
| 10,248,868 | B2 | 4/2019 | Oami |
| 10,547,771 | B2 | 1/2020 | Nishiura et al. |
| 2006/0007501 | A1 | 1/2006 | Kawada |
| 2008/0084586 | A1 | 4/2008 | Nagata et al. |
| 2009/0096897 | A1 | 4/2009 | Saito |
| 2011/0013048 | A1 | 1/2011 | Wei et al. |
| 2018/0146157 | A1 | 5/2018 | Karpinsky |
| 2019/0199901 | A1 | 6/2019 | Kondo et al. |
| 2020/0293784 | A1 | 9/2020 | Zhou |
| 2020/0304883 | A1 | 9/2020 | Choi et al. |

FOREIGN PATENT DOCUMENTS

| | | | |
|---|---|---|---|
| CN | 101582991 | A | 11/2009 |
| CN | 102629973 | A | 8/2012 |
| CN | 108234812 | A | 6/2018 |
| JP | 2003-169225 | A | 6/2003 |
| JP | 2006-25007 | A | 1/2006 |
| JP | 2008-044141 | A | 2/2008 |
| JP | 2008-61032 | A | 3/2008 |
| JP | 2011-239178 | A | 11/2011 |
| JP | 2012-165182 | A | 8/2012 |
| WO | 01/03013 | A1 | 1/2001 |

OTHER PUBLICATIONS

International Preliminary Report On Patentability and Written Opinion issued in PCT/JP2020/008568; issued Sep. 28, 2021.
The extended European search report issued by the European Patent Office on Feb. 7, 2022, which corresponds to European Patent Application No. 20776733.6-1209 and is related to U.S. Appl. No. 17/470,069.
An Office Action; "Notice of Reasons for Refusal," mailed by the Japanese Patent Office on Oct. 25, 2022, which corresponds to Japanese Patent Application No. 2021-508871 and is related to U.S. Appl. No. 17/470,069; with English language translation.
An Office Action mailed by China National Intellectual Property Administration on Nov. 1, 2022, which corresponds to Chinese U.S. Appl. No. 17/470,069.7 and is related to U.S. Appl. No. 17/470,069; with English language translation.
An Office Action; "Notice of Reasons for Refusal," mailed by the Japanese Patent Office on Apr. 25, 2023, which corresponds to Japanese Patent Application No. 2021-508871 and is related to U.S. Appl. No. 17/470,069; with English language translation.
An Office Action mailed by China National Intellectual Property Administration on Aug. 8, 2023, which corresponds to Chinese Patent Application No. 202080022180.7 and is related to U.S. Appl. No. 17/470,069; with English language translation.
An Office Action; "Decision of Rejection," mailed by China National Intellectual Property Administration on Oct. 30, 2023, which corresponds to Chinese Patent Application No. 202080022180.7 and is related to U.S. Appl. No. 18/480,935; with English language translation.
An Office Action; "Decision of Refusal," mailed by the Japanese Patent Office on Oct. 5, 2023, which corresponds to Japanese Patent Application No. 2021-508871 and is related to U.S. Appl. No. 18/480,935; with English language.
A Notification of Reexamination mailed by the State Intellectual Property Office of the People's Republic of China on Jul. 2, 2024, which corresponds to Chinese Patent Application No. 202080022180.7 and is related to U.S. Appl. No. 18/480,935; with English language translation.

FIG. 9
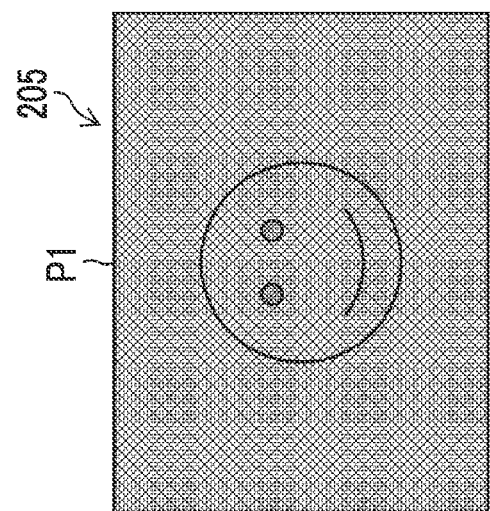
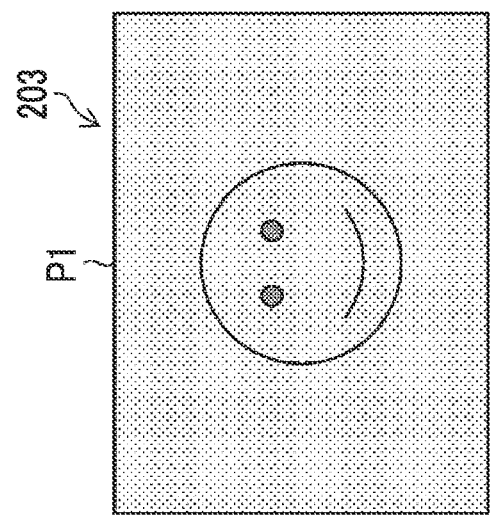
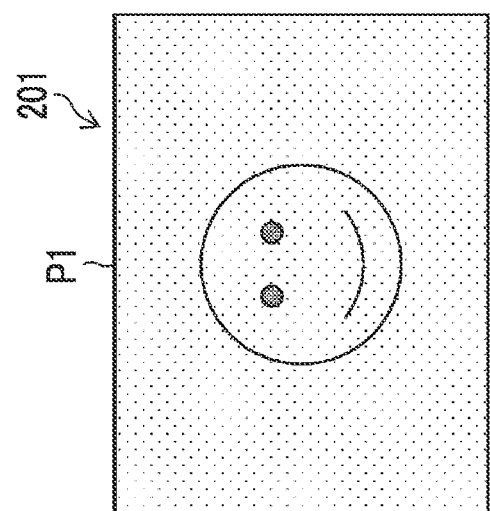

FIG. 11
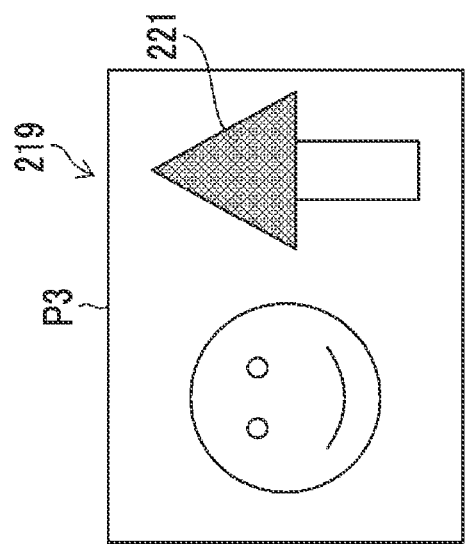
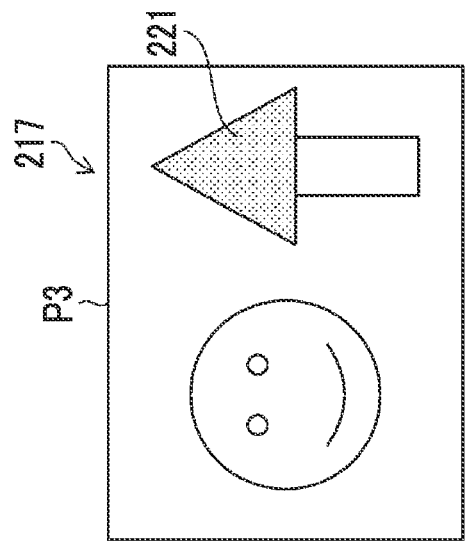
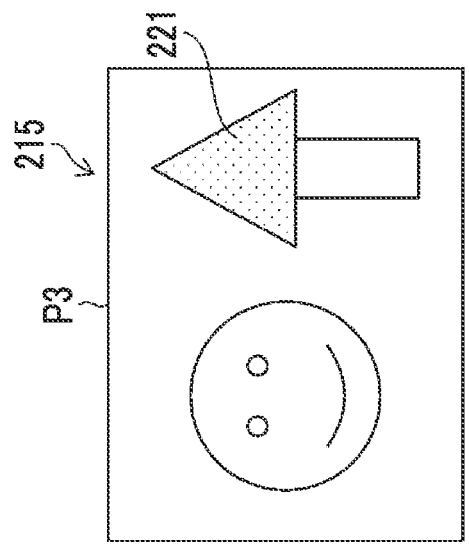

FIG. 12
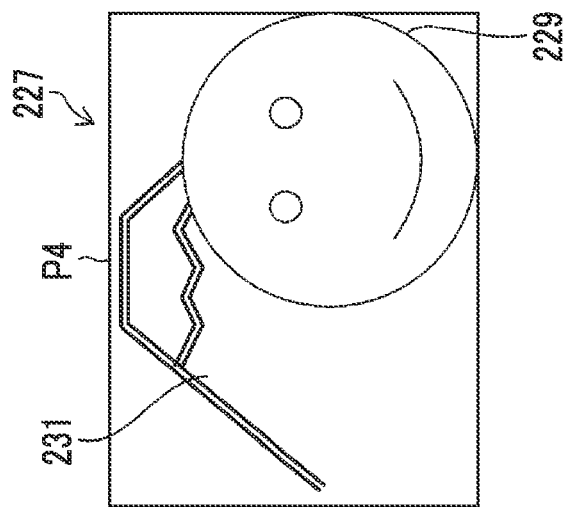
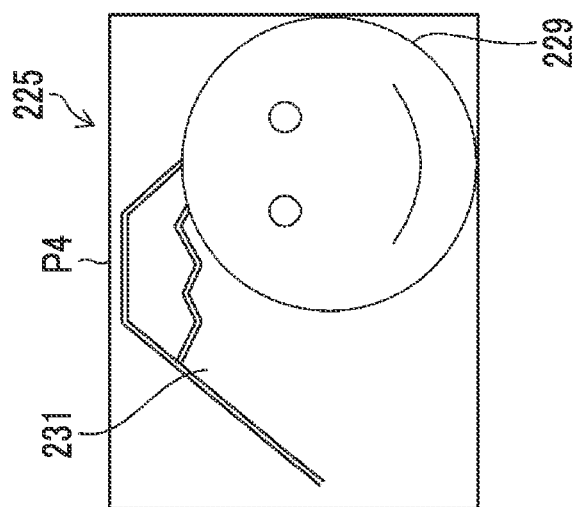
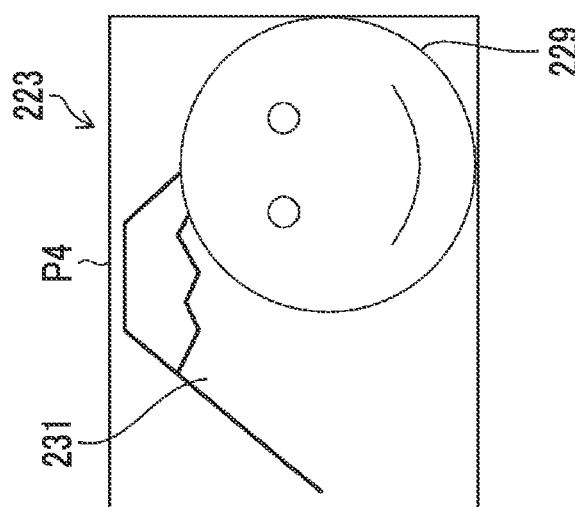

FIG. 13
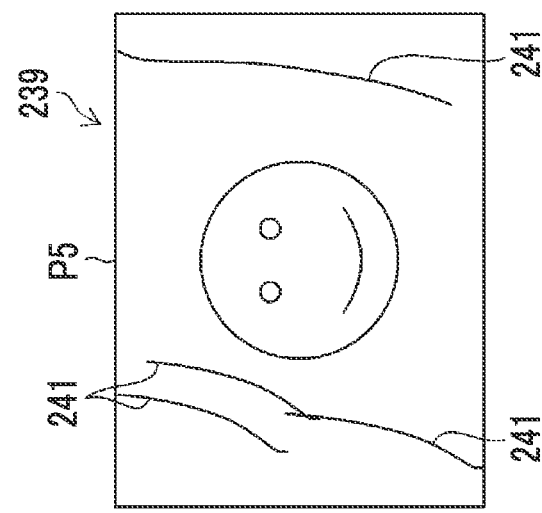
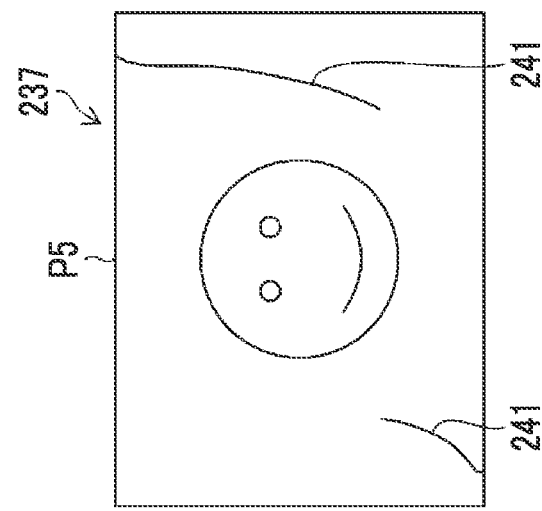
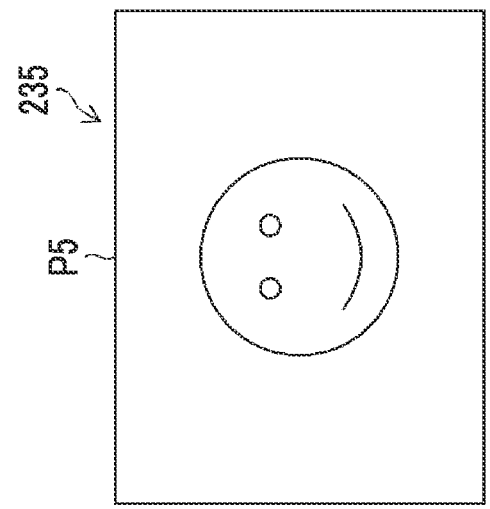

IMAGE PROCESSING DEVICE, IMAGE PROCESSING METHOD, IMAGING DEVICE, AND PROGRAM

CROSS-REFERENCE TO RELATED APPLICATIONS

This application is a Continuation of U.S. patent application Ser. No. 17/470,069 filed on Sep. 9, 2021 which is a Continuation of PCT International Application No. PCT/JP2020/008568 filed on Mar. 2, 2020, which claims priority under 35 U.S.C § 119(a) to Japanese Patent Application No. 2019-054333 filed on Mar. 22, 2019. Each of the above application(s) is hereby expressly incorporated by reference, in its entirety, into the present application.

BACKGROUND OF THE INVENTION

1. Field of the Invention

The present invention relates to an image processing device, an image processing method, an imaging device, and a program, and relates to an image processing device, an image processing method, an imaging device, and a program that change image processing according to a length of an elapsed date and time from a time of imaging.

2. Description of the Related Art

In the related art, a technique has been proposed in which predetermined processing is performed on an image to make a viewer more interested in the image.

For example, JP2008-61032A discloses a technique in which, in a case where a plurality of image contents are continuously output, the image contents are continuously output by inserting an effect corresponding to attribute information possessed by each image content.

SUMMARY OF THE INVENTION

Here, there is a change over time as one of changes that interest people. For example, in leather products, a surface of leather gradually changes according to the number of years of use, and each change gives a different aesthetic appearance. In addition, for example, the taste of sake gradually changes according to a storage period, and a person who drinks sake can enjoy the change of the taste.

JP2008-61032A mentioned above discloses a technique in which a recording date and time of the content is compared with a reproduction date and time and a sepia effect is selected in a case where the value is equal to or greater than a threshold value (JP2008-61032A: paragraph 0055), but this change is a one-time change and is not a change over time that gradually changes according to an elapsed time.

The present invention has been made in view of such circumstances, and an object of the present invention is to provide an image processing device, an image processing method, an imaging device, and a program capable of performing image processing that changes over time.

An image processing device according to an aspect of the present invention for achieving the above object comprises: an image acquisition unit that acquires a captured image to be processed from a storage unit in which a captured image having first date and time information indicating a time of imaging is stored, a date and time information acquisition unit that acquires the first date and time information from the captured image to be processed and acquires second date and time information indicating a date and time when the captured image to be processed is acquired from the storage unit by the image acquisition unit, an elapsed date and time calculation unit that calculates an elapsed date and time from the time of imaging by making a comparison between the first date and time information and the second date and time information acquired by the date and time information acquisition unit, and an image processing unit that selects image processing based on a length of the elapsed date and time from among a plurality of kinds of image processing that change according to the length of the elapsed date and time and performs the selected image processing on the captured image to be processed.

According to the present aspect, the elapsed date and time from the time of imaging is calculated, and the image processing is performed based on the length of the calculated elapsed date and time from among the plurality of kinds of image processing that change according to the length of the elapsed date and time. Thus, in the present aspect, the image processing that changes over time can be performed on the captured image.

Preferably, the image processing device further comprises a display control unit that causes a display unit to display the captured image to be processed on which the image processing is performed by the image processing unit.

Preferably, the image processing device further comprises a printing control unit that causes a printing unit to print the captured image to be processed on which the image processing is performed by the image processing unit.

Preferably, the captured image to be processed on which the image processing is performed by the image processing unit and the captured image to be processed before the image processing is performed by the image processing unit are stored in the storage unit.

Preferably, the captured image to be processed on which the image processing is performed by the image processing unit is not stored in the storage unit.

Preferably, the image processing device further comprises a relationship input unit that receives input of a correspondence on a time base between the plurality of kinds of image processing and the length of the elapsed date and time.

Preferably, the image processing unit changes an overall color of the captured image to be processed according to the length of the elapsed date and time.

Preferably, the image processing unit changes a color of a subject of a part of the captured image to be processed according to the length of the elapsed date and time.

Preferably, the image processing unit lightens a color of a background of the captured image to be processed according to the length of the elapsed date and time.

Preferably, the image processing unit changes a color or a hue of a part of the captured image to be processed according to the length of the elapsed date and time.

Preferably, the image processing unit changes a blurriness condition of a region of a part of the captured image to be processed according to the length of the elapsed date and time.

Preferably, the image processing unit changes the blurriness condition of a foreground or a background of a person in the captured image according to the length of the elapsed date and time.

Preferably, the image processing unit changes a decorative image added to the captured image to be processed according to the length of the elapsed date and time.

An imaging device according to another aspect of the present invention comprises the above-described image processing device.

Preferably, the imaging device further comprises an imaging mode setting unit that sets one imaging mode from among a plurality of imaging modes, in which the image processing unit changes the plurality of kinds of image processing that change according to the length of the elapsed date and time in accordance with the imaging mode set by the imaging mode setting unit.

An image processing method according to still another aspect of the present invention comprises: a step of acquiring a captured image to be processed from a storage unit in which a captured image having first date and time information indicating a time of imaging is stored; a step of acquiring the first date and time information from the captured image to be processed and acquiring second date and time information indicating a date and time when the captured image to be processed is acquired from the storage unit; a step of calculating an elapsed date and time from the time of imaging by making a comparison between the first date and time information and the second date and time information; and a step of selecting image processing based on a length of the elapsed date and time from among a plurality of kinds of image processing that change according to the length of the elapsed date and time and performing the selected image processing on the captured image to be processed.

A program according to still another aspect of the present invention causes a computer to execute an image processing process comprising: a step of acquiring a captured image to be processed from a storage unit in which a captured image having first date and time information indicating a time of imaging is stored; a step of acquiring the first date and time information from the captured image to be processed and acquiring second date and time information indicating a date and time when the captured image to be processed is acquired from the storage unit; a step of calculating an elapsed date and time from the time of imaging by making a comparison between the first date and time information and the second date and time information; and a step of selecting image processing based on a length of the elapsed date and time from among a plurality of kinds of image processing that change according to the length of the elapsed date and time and performing the selected image processing on the captured image to be processed.

According to the present invention, the elapsed date and time from the time of imaging is calculated, and the image processing is performed based on the length of the calculated elapsed date and time from among the plurality of kinds of image processing that change according to the length of the elapsed date and time. Therefore, it is possible to perform the image processing that changes over time on the captured image.

BRIEF DESCRIPTION OF THE DRAWINGS

FIG. 9 is a diagram showing image processing in which an overall color of a captured image changes over time.

FIG. 11 is a diagram showing image processing in which the same color or hue of a captured image changes over time.

FIG. 12 is a diagram showing image processing in which a blurriness condition of a region of a part of a captured image changes over time.

FIG. 13 is a diagram showing image processing in which a decorative image added to a captured image changes over time.

DESCRIPTION OF THE PREFERRED EMBODIMENTS

Hereinafter, preferred embodiments of an image processing device, an image processing method, an imaging device, and a program according to the present invention will be described with reference to the accompanying drawings.

<Digital Camera Including Printer>

A digital camera including a printer (imaging device) 10 equipped with an image processing device 101 (see FIG. 6) of the embodiment of the present invention is a digital camera with a built-in printer, and has a function of printing a captured image on the spot. The digital camera 10 including a printer prints the image on an instant film using an instant film pack. In addition, the digital camera 10 including a printer of the present embodiment has a sound recording function and can record a voice in association with a captured image.

[Appearance Configuration]

Figure 1:
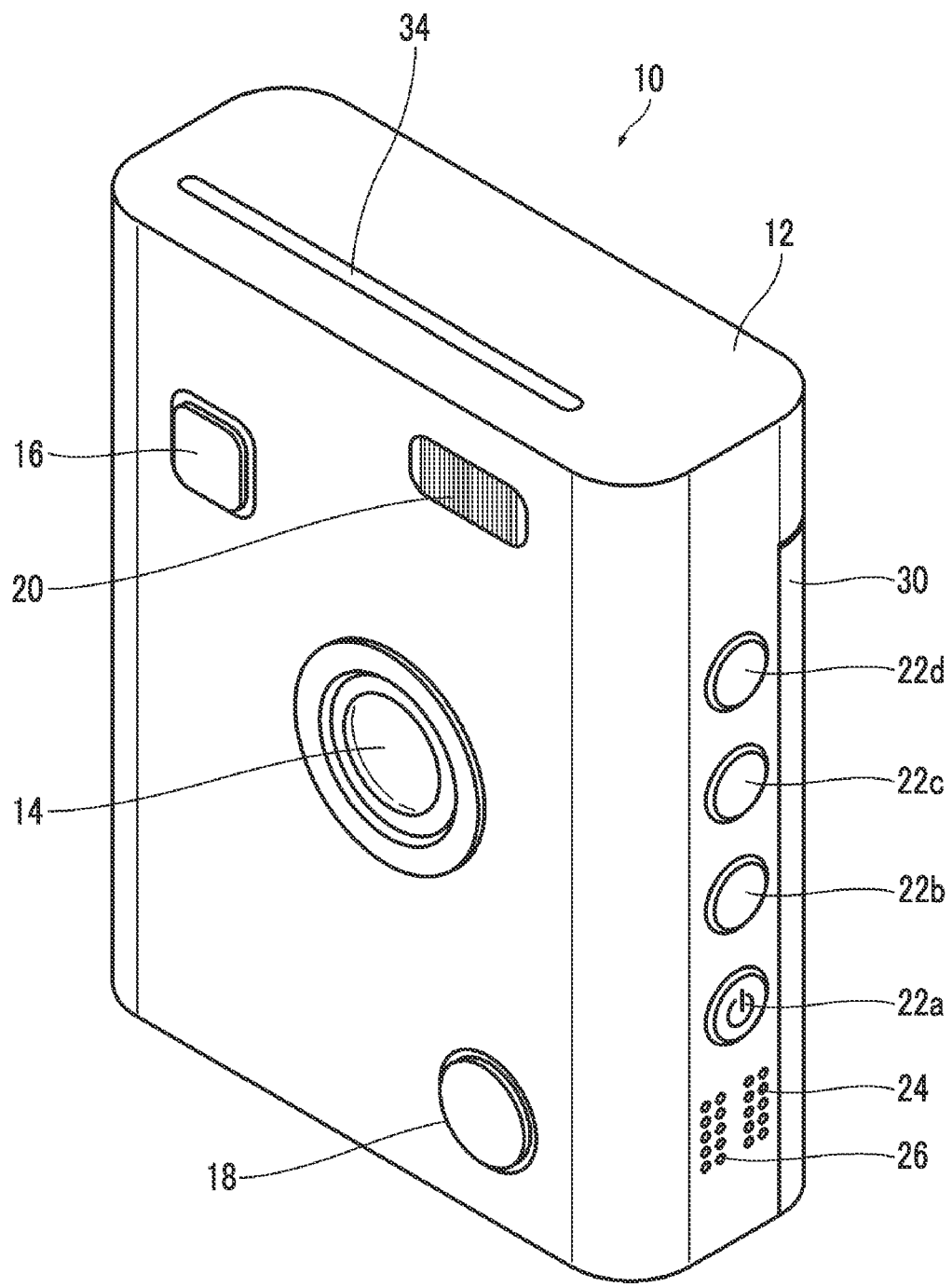
FIG. 1 is a front perspective view showing an example of a digital camera including a printer.
Figure 2:
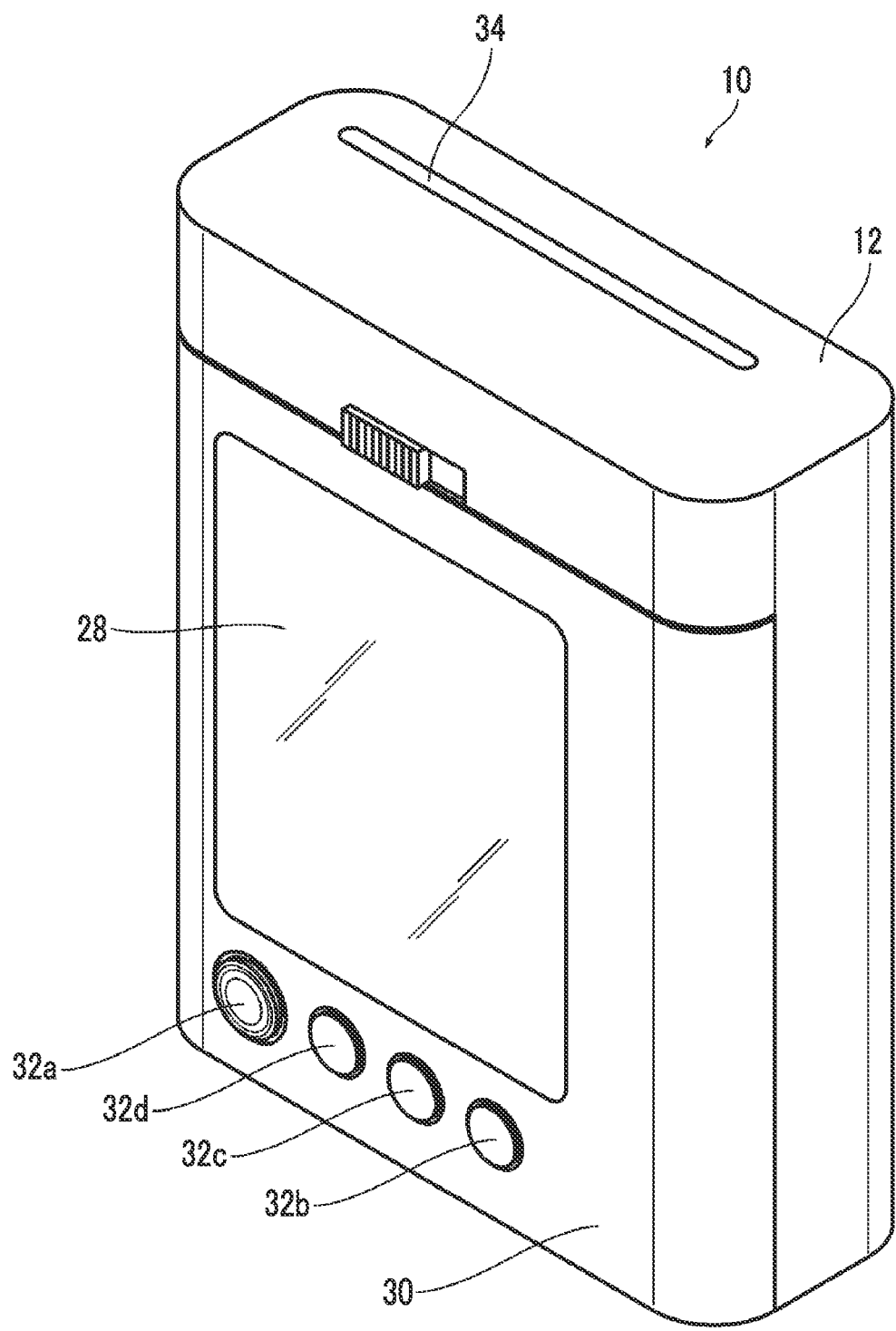
FIG. 2 is a back perspective view of the digital camera including a printer.

FIG. 1 is a front perspective view showing an example of a digital camera including a printer. FIG. 2 is a back perspective view of the digital camera including a printer shown in FIG. 1.

As shown in FIGS. 1 and 2, the digital camera 10 including a printer has a portable camera body 12. The camera body 12 has a vertically long rectangular parallelepiped shape with a thin thickness in a front-rear direction and a longer dimension in a longitudinal direction than a dimension in a lateral direction.

As shown in FIG. 1, an imaging lens 14, a release button 16, a sound recording button 18, and a strobe light emitting window 20 are provided on a front side of the camera body 12. In addition, a power button 22a, a menu button 22b, an OK button 22c, a mode switching button 22d, a microphone hole 24, and a speaker hole 26 are provided on one side surface of the camera body 12. The release button 16 is a button for providing an instruction of recording of a captured image. The power button 22a is a button for turning on and off a power of the digital camera 10 including a printer. The menu button 22b is a button for calling up a menu screen. The OK button 22*c* is a button for providing an instruction of OK. The mode switching button 22*d* is a button for switching between an auto print mode and a manual print mode in an imaging mode. The imaging mode can be changed by calling up the menu screen by the menu button 22*b*, displaying an imaging mode change screen, and making a decision by the OK button 22*c*. A suitable imaging condition is set for each imaging mode. The imaging mode includes, for example, a portrait mode and a landscape mode. In this case, the menu button 22*b* and the OK button 22*c* form an imaging mode setting unit.

As shown in FIG. 2, a touch panel type display (display unit) 28, a film lid cover 30, and various operation buttons are provided on a back side of the camera body 12. The film lid cover 30 is a cover that opens and closes a film loading chamber. The operation buttons include a joystick 32*a*, a print button 32*b*, a playback button 32*c*, and a cancel button 32*d*. The print button 32*b* is a button for providing an instruction of printing. The playback button 32*c* is a button for providing an instruction of switching to a playback mode. The cancel button 32*d* is a button for providing an instruction of a cancellation of an operation.

As shown in FIGS. 1 and 2, a film discharge port 34 is provided on an upper surface of the camera body 12. The printed instant film is discharged from the film discharge port 34.

[Configuration of Printer Part of Digital Camera including Printer]

Figure 3:
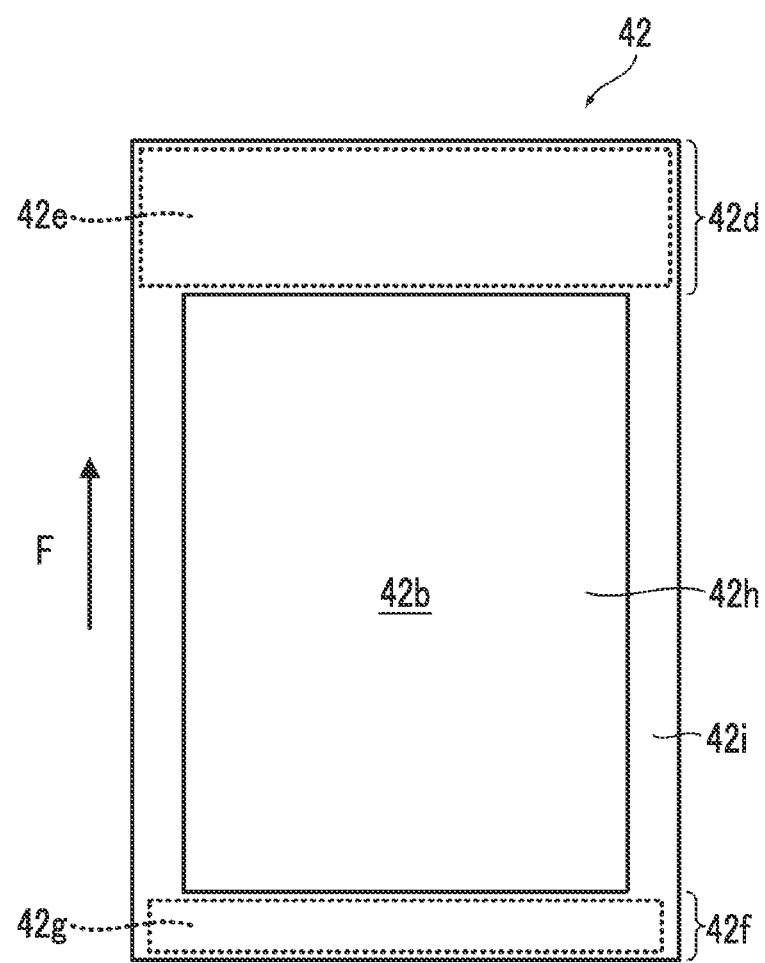
FIG. 3 is a front view of an instant film.
Figure 4:
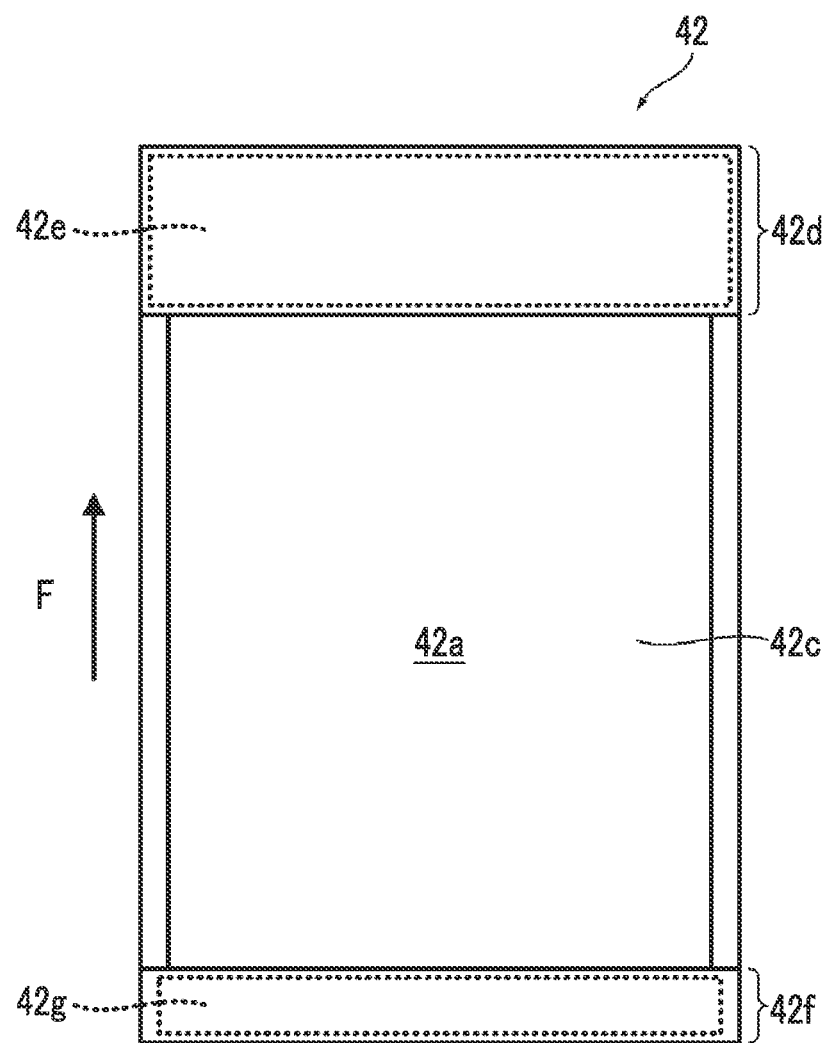
FIG. 4 is a back view of the instant film.
Figure 5:
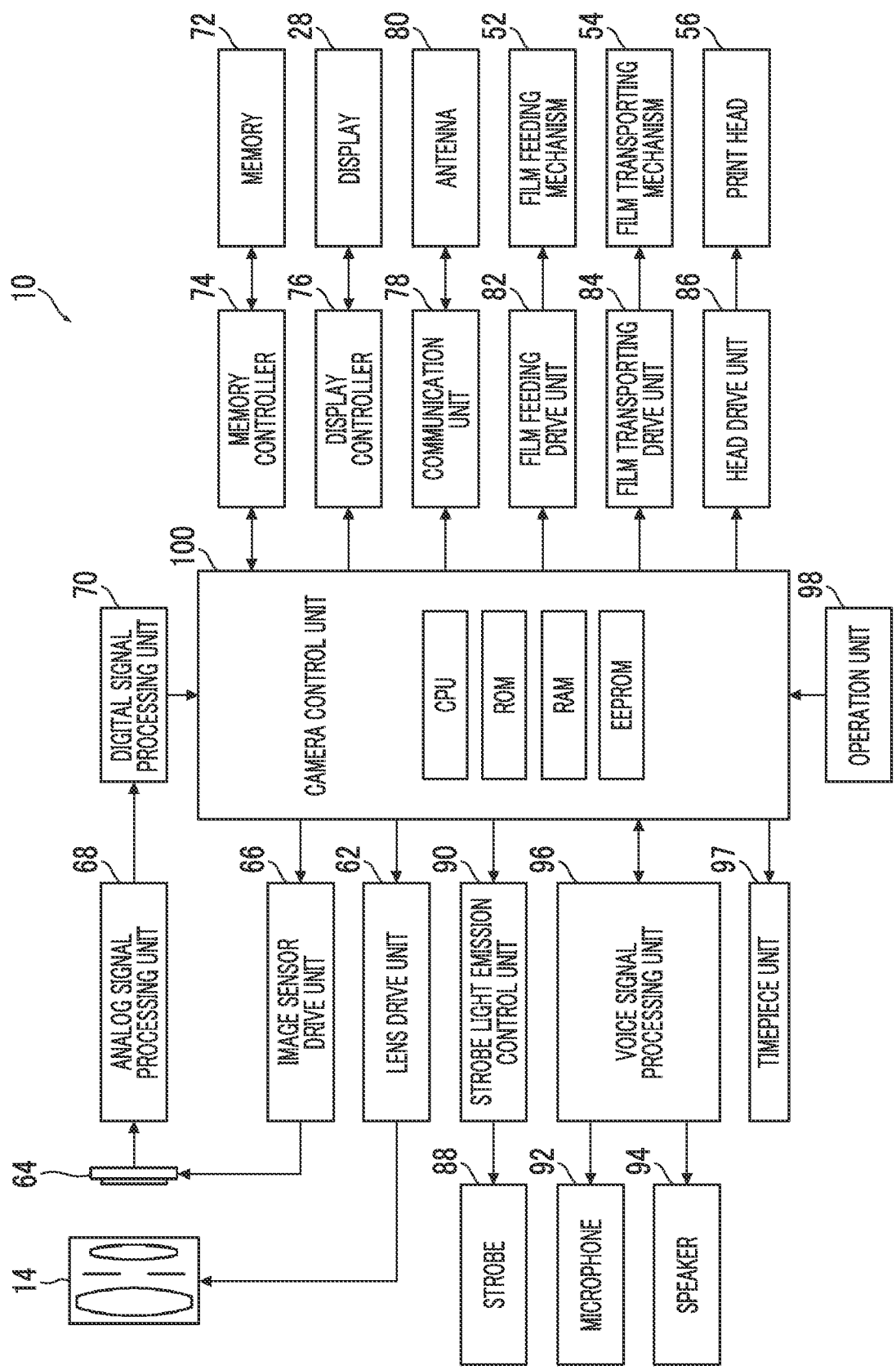
FIG. 5 is a block diagram showing a main part of an electric configuration of the digital camera including a printer.

The digital camera 10 including a printer comprises a film loading chamber (not shown), a film feeding mechanism 52, a film transporting mechanism 54, a print head 56, and the like as components of a printer part that is a print portion (see FIG. 5). The film loading chamber is loaded with an instant film pack having a structure in which a plurality of instant films are accommodated in a case. FIG. 3 is a front view of the instant film 42, and FIG. 4 is a back view of the instant film 42. In FIGS. 3 and 4, a direction indicated by an arrow F is a direction in which the instant film 42 is used, and the instant film 42 is transported in the direction indicated by the arrow F. Therefore, in a case where the film is loaded into the digital camera 10 including a printer, the direction indicated by the arrow F is a discharge direction of the instant film 42.

The instant film 42 is a self-developing instant film having a rectangular card shape. The instant film 42 is configured such that a back surface side thereof is an exposure surface 42*a* and a front surface side thereof is an observation surface 42*b*. The exposure surface 42*a* is a surface for recording an image by exposure, and the observation surface 42*b* is a surface for observing the recorded image.

As shown in FIG. 3, the observation surface 42*b* of the instant film 42 comprises an observation region 42*h*. In addition, as shown in FIG. 4, the exposure surface 42*a* of the instant film 42 comprises an exposure region 42*c*, a pod portion 42*d*, and a trap portion 42*f* After the exposure, a development treatment liquid of the pod portion 42*d* spreads over the exposure region 42*c*, and thus, the instant film 42 is development-treated. A development treatment liquid pod 42*e* containing the development treatment liquid is provided in the pod portion 42*d*. The development treatment liquid of the pod portion 42*d* is squeezed out from the pod portion 42*d* by passing the instant film 42 between a pair of rollers and spreads over the exposure region 42*c*. The development treatment liquid remaining after the spreading treatment is trapped by the trap portion 42*f* An absorbing material 42*g* is provided in the trap portion 42*f*.

An instant film pack is loaded into the film loading chamber (not shown) provided inside the camera body 12. In a case where printing is performed, the films are fed one by one by a claw (claw-shaped member) (not shown) of the film feeding mechanism 52, and are transported by a roller (not shown) of the film transporting mechanism 54. In addition, in the transporting process, a spreading roller pair (not shown) presses the pod portion 42*d* of the instant film 42 to cause the development treatment liquid to spread. The print head 56 is composed of a line-type exposure head, and irradiates the exposure surface 42*a* of the instant film 42 transported by the film transporting mechanism 54 with print light for every line, and records a captured image on the instant film 42 in a single pass. A frame 42*i* is provided around the observation region 42*h*, and the captured image is displayed inside the frame 42*i*.

[Electric Configuration of Digital Camera including Printer]

FIG. 5 is a block diagram showing a main part of an electric configuration of the digital camera 10 including a printer.

As shown in FIG. 5, the digital camera 10 including a printer comprises the imaging lens 14, a lens drive unit 62, an image sensor 64, an image sensor drive unit 66, an analog signal processing unit 68, a digital signal processing unit 70, a memory (storage unit) 72, a memory controller 74, a display 28, a display controller 76, a communication unit 78, and an antenna 80. In addition, the digital camera 10 including a printer comprises a film feeding drive unit 82, a film transporting drive unit 84, a head drive unit 86, a strobe 88, a strobe light emission control unit 90, a microphone 92, a speaker 94, a voice signal processing unit 96, a timepiece unit 97, an operation unit 98, and a camera control unit 100.

The imaging lens 14 forms an optical image of a subject on a light-receiving surface of the image sensor 64. The imaging lens 14 has a focusing function and comprises a stop and a shutter (not shown). The lens drive unit 62 includes a motor for driving the focusing function of the imaging lens 14 and a drive circuit thereof, a motor for driving the stop and a drive circuit thereof, and a motor for driving the shutter and a drive circuit thereof, and operates the focusing mechanism, the stop, and the shutter in response to a command from the camera control unit 100.

The image sensor 64 is, for example, a two-dimensional solid-state imaging element such as a charge coupled device (CCD) image sensor or a complementary metal oxide semiconductor (CMOS) image sensor. The image sensor 64 has an imaging region having an aspect ratio corresponding to a printable region of the instant film to be used. The image sensor drive unit 66 includes a drive circuit for the image sensor 64, and operates the image sensor 64 in response to a command from the camera control unit 100.

The analog signal processing unit 68 receives an analog image signal for each pixel output from the image sensor 64, converts the analog image signal into a digital image signal by performing signal processing (for example, sampling two correlation pile processing or amplification processing), and outputs the digital image signal.

The digital signal processing unit 70 receives a digital image signal output from the analog signal processing unit 68, and generates image data by performing signal processing (for example, gradation transformation processing, white balance correction processing, gamma-correction processing, demosaicing, or YC conversion processing).

The memory 72 is a non-temporary recording medium that stores image data (captured image) and voice data obtained through imaging, and for example, a memory card or the like is used. The memory 72 is an example of a storage unit. The memory controller 74 reads and writes data from and in the memory 72 under the control using the camera control unit 100.

The display 28 is, for example, a liquid crystal display (LCD) or an organic electro-luminescence display (OELD). In addition, the display 28 may be a plasma display, a field emission display (FED), or electronic paper. The display controller 76 displays a video on the display 28 under the control using the camera control unit 100.

The communication unit 78 communicates with another digital camera 10 including a printer (another device) via the antenna 80 in a wireless manner under the control using the camera control unit 100. The communication unit 78 can directly communicate with another device at a short distance by short-range wireless communication such as a near field communication (NFC) standard or Bluetooth (registered trademark). In addition, the communication unit 78 is connected to an information communication network such as the Internet via a Wi-Fi spot (Wi-Fi: registered trademark), and can communicate with another digital camera 10 including a printer (another device) regardless of the distance.

The film feeding drive unit 82 includes a motor for driving a claw (claw-shaped member) (not shown) of the film feeding mechanism 52 and a drive circuit thereof, and drives the motor to operate the claw under the control using the camera control unit 100.

The film transporting drive unit 84 includes a motor for driving the transport roller pair (not shown) of the film transporting mechanism 54 and a drive circuit thereof, and a motor for driving the spreading roller pair (not shown) and a drive circuit thereof, and operates the transport roller pair and the spreading roller pair by driving the motor of the transport roller pair and the motor of the spreading roller pair under the control using the camera control unit 100.

The head drive unit 86 includes a drive circuit of the print head 56, and drives the print head 56 under the control using the camera control unit 100.

The strobe 88 comprises, as a light source, a xenon tube or a light emitting diode (LED), and makes the light source emit light, and irradiates the subject with flash light. The flash light is emitted from the strobe light emitting window 20 (see FIG. 1) provided on the front surface of the camera body 12. The strobe light emission control unit 90 includes a drive circuit of the strobe 88, and causes the strobe 88 to emit light in response to a command from the camera control unit 100.

The microphone 92 collects an external voice via the microphone hole 24 (see FIG. 2) provided in the camera body 12. The speaker 94 outputs a voice to the outside through the speaker hole 26 provided in the camera body 12. The voice signal processing unit 96 converts a voice signal input from the microphone 92 into a digital voice signal by performing signal processing on the voice signal, and outputs the digital voice signal. In addition, the voice signal processing unit 96 performs signal processing on the voice data given from the camera control unit 100, and outputs the voice data from the speaker 94. The timepiece unit 97 holds information on a date and time, and the camera control unit 100 sets an imaging time point (date and time) by referring to the information.

The operation unit 98 includes various operation members such as the release button 16, the sound recording button 18, the power button 22a, the menu button 22b, the OK button 22c, the joystick 32a, the print button 32b, the playback button 32c, and the cancel button 32d, and a signal processing circuit thereof, and outputs a signal based on an operation of each operation member to the camera control unit 100.

The camera control unit 100 is a control unit that collectively controls overall operation of the digital camera 10 including a printer. The camera control unit 100 comprises a central processing unit (CPU), a read only memory (ROM), a random access memory (RAM), an electronically erasable and programmable read only memory (EEPROM), and the like. The camera control unit 100 is a computer including the CPU or the like, and realizes various functions described below by executing a control program.

<Functional Configuration of Image Processing Device>

The digital camera 10 including a printer is equipped with the image processing device 101, and a main function of the image processing device 101 is provided in the camera control unit 100.

Figure 6:
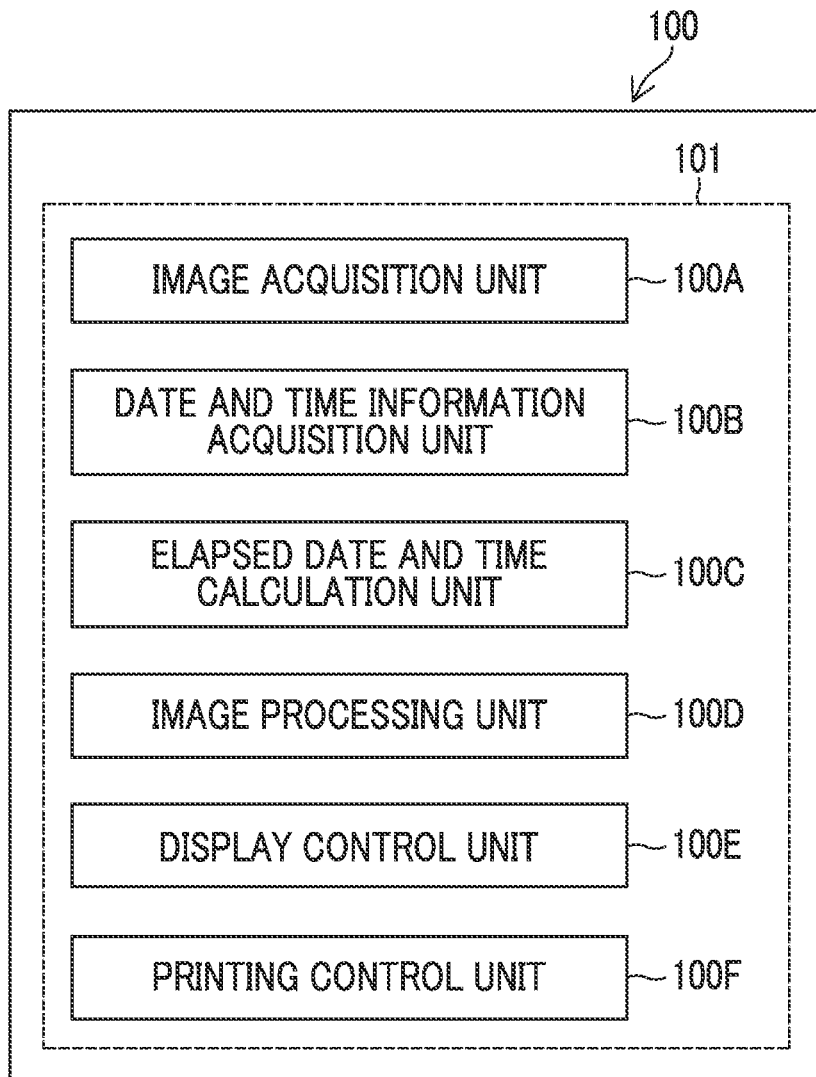
FIG. 6 is a diagram showing an example of a functional configuration of an image processing device.

FIG. 6 is a diagram showing an example of a functional configuration of the image processing device 101 provided in the camera control unit 100. The image processing device 101 comprises an image acquisition unit 100A, a date and time information acquisition unit 100B, an elapsed date and time calculation unit 100C, an image processing unit 100D, a display control unit 100E, and a printing control unit 100F.

The functions of each unit of the camera control unit 100 (image processing device 101) described above can be realized by using various processors and recording media. The various processors include, for example, a CPU that is a general-purpose processor that executes software (program) to realize various functions. In addition, the various processors described above also include a programmable logic device (PLD) such as a graphics processing unit (GPU) or a field programmable gate array (FPGA), which is a processor specialized in image processing. A programmable logic device is a processor of which a circuit configuration can be changed after manufacturing. Further, a dedicated electric circuit that is a processor having a circuit configuration designed to be dedicated to execute specific processing, such as an application specific integrated circuit (ASIC), is also included in the various processors described above.

The functions of each unit may be realized by one processor, or may be realized by a plurality of processors of the same type or different types (for example, a plurality of FPGAs, or a combination of a CPU and an FPGA, or a combination of a CPU and a GPU). In addition, one processor may have a plurality of functions. As an example in which the plurality of functions are configured by one processor, first, as represented by a computer, one processor is configured by a combination of one or more CPUs and software and this processor functions as the plurality of functions. Second, as represented by a system on chip (SoC), a processor that realizes the functions of the entire system by using one integrated circuit (IC) chip is used. In this way, the various functions are configured by using one or more of the various processors described above as a hardware structure. Further, the hardware structure of these various processors is more specifically an electric circuit (circuitry) in which circuit elements such as semiconductor elements are combined. These electric circuits may be electric circuits that realize the above-described functions by using OR, AND, logical NOT, exclusive OR, and a logical operation that is a combination thereof.

In a case where the above-described processor or electric circuit executes software (program), a computer (various processors and electric circuits configuring the camera control unit 100 (image processing device 101) and/or combinations thereof) readable code of the software to be executed is stored in a non-temporary recording medium such as a ROM, and the computer refers to the software. The software stored in the non-temporary recording medium includes a program for executing the imaging and compositing of the captured images and data used for the execution. The non-temporary recording medium for recording the code may be various optical magnetic recording devices, semiconductor memories, or the like instead of a ROM. In processing using software, for example, a RAM is used as a temporary storage region.

The image acquisition unit 100A acquires a captured image to be processed from the captured image stored in the memory 72. The memory 72 stores a plurality of captured images taken by the digital camera 10 including a printer. The captured image has first date and time information indicating a time of imaging. Here, the first date and time information is information having at least one of the year, month, day, or time when the captured image is taken. From the plurality of captured images stored in the memory 72, a captured image that is a processing target is selected in various aspects. For example, the plurality of captured images stored in the memory 72 are listed on the display 28, and a user selects a captured image to be processed from the listed captured images. A single or a plurality of captured images to be processed may be selected, or all of the captured images stored in the memory 72 may be selected.

The date and time information acquisition unit 100B acquires the first date and time information and second date and time information of the captured image acquired by the image acquisition unit 100A. Here, the second date and time information is information indicating a date and time when the captured image to be processed is acquired from the memory 72 by the image acquisition unit 100A. In a case where the captured image is acquired by the image acquisition unit 100A, the image processing device 101 immediately performs image processing, so that the second date and time information can be considered to be substantially the same as the information indicating the date and time when the image processing is performed.

The elapsed date and time calculation unit 100C calculates an elapsed date and time from the time of imaging to a time when the image acquisition unit 100A acquires the captured image by making a comparison between the first date and time information and the second date and time information acquired by the date and time information acquisition unit 100B. For example, in a case where the first date and time information is 9:04 on Dec. 20, 2018, and the second date and time information is 9:06 on Dec. 21, 2018, the elapsed date and time calculation unit 100C calculates the elapsed date and time as 1 day and 2 minutes.

The image processing unit 100D performs image processing that changes according to a length of the elapsed date and time on the captured image selected as the processing target. That is, the image processing unit 100D performs image processing that changes over time on the captured image. Specifically, the image processing unit 100D selects image processing based on the length of the elapsed date and time from among a plurality of kinds of image processing that change according to the length of the elapsed date and time, and performs the selected image processing on the captured image to be processed.

Figure 7:
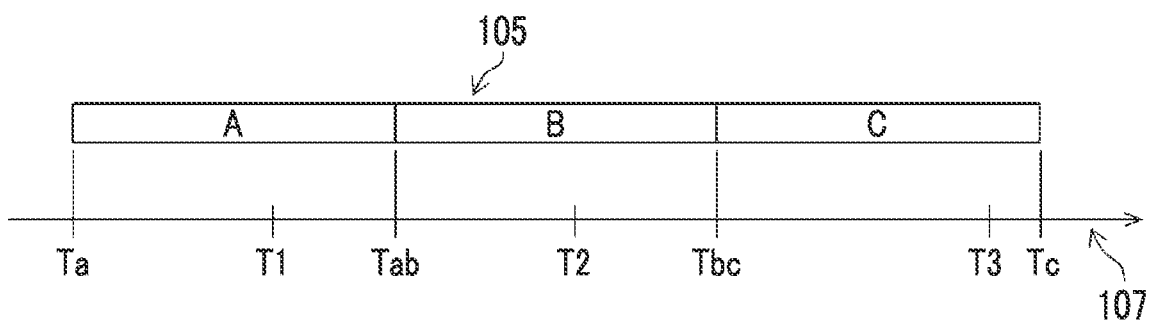
FIG. 7 is a conceptual diagram showing image processing of a change over time performed by the image processing unit.

FIG. 7 is a conceptual diagram showing the image processing of the change over time performed by the image processing unit 100D. FIG. 7 shows an example of a relationship between three kinds of preset image processing (image processing A, image processing B, and image processing C) (reference numeral 105) performed by the image processing unit 100D and an elapsed date and time T (reference numeral 107). The image processing A is performed during a period when the elapsed date and time T is from Ta to Tab, the image processing B is performed during a period from Tab to Tbc, and the image processing C is performed during a period from Tbc to Tc. For example, the image processing A is selected for an elapsed date and time T1, the image processing B is selected for an elapsed date and time T2, and the image processing C is selected for an elapsed date and time T3. In a case shown in FIG. 7, the period from Ta to Tab of the image processing A, the period from Tab to Tbc of the image processing B, and the period from Tbc to Tc of the image processing C are constant, but are not limited thereto. The user may optionally decide a correspondence on a time base between the plurality of kinds of image processing and the length of the elapsed date and time. In a case shown in FIG. 7, the user can optionally set the period from Ta to Tab of the image processing A, the period from Tab to Tbc of the image processing B, and the period from Tbc to Tc of the image processing C. In this case, the user inputs the correspondence via an operation unit (relationship input unit) 98. The image processing A, the image processing B, and the image processing C are different kinds of image processing from each other, and the captured image is changed over time by changing processing contents of the image processing A, the image processing B, and the image processing C. In addition, the processing contents of the plurality of kinds of preset image processing may be changed according to an imaging mode or an imaging condition. For example, the processing contents of the image processing A, the image processing B, and the image processing C may be changed for each imaging mode, or the processing contents of the image processing A, the image processing B, and the image processing C may be changed for each imaging condition.

The captured image to be processed on which the image processing is performed by the image processing unit 100D may be stored in the memory 72, or the captured image on which the image processing is performed may not be stored in the memory 72. In a case where the captured image after the image processing is stored in the memory 72, the user can enjoy the captured image that has changed over time even after a certain period of time has elapsed. In addition, in a case where the captured image after the image processing is not stored in the memory 72, the user enjoys the change over time by printing the captured image after the image processing. The captured image before the image processing, which is selected as the processing target, may or may not be stored in the memory 72.

Returning to FIG. 6, the display control unit 100E causes the display 28 to display the captured image to be processed on which the image processing is performed by the image processing unit 100D. The user can enjoy the change over time of the captured image by confirming the displayed captured image after the image processing.

The printing control unit 100F controls printing of the captured image on which the image processing is performed. For example, the printing control unit 100F causes the printing unit to print the captured image to be processed on which the image processing is performed by the image processing unit 100D automatically or in response to a user's instruction. The user can enjoy the change over time of the captured image by confirming the printed captured image after the image processing.

Figure 8:
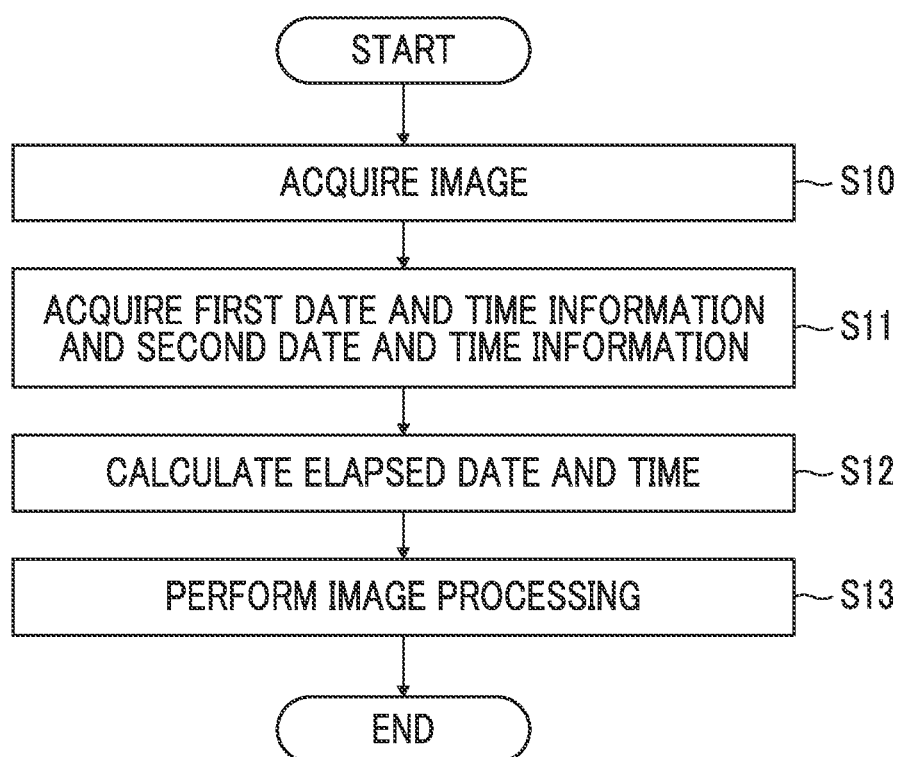
FIG. 8 is a flowchart showing an image processing method.

Next, an image processing method (image processing process) using the image processing device 101 will be described. FIG. 8 is a flowchart showing the image processing method.

First, the image acquisition unit 100A acquires the selected captured image to be processed (step S10). After that, the date and time information acquisition unit 100B acquires the first date and time information and the second date and time information of the captured image acquired by the image acquisition unit 100A (step S11). Next, the elapsed date and time calculation unit 100C calculates the elapsed date and time from the first date and time information and the second date and time information (step S12). After that, the image processing unit 100D performs the image processing based on the length of the calculated elapsed date and time (step S13).

Each of the above-described configurations and functions can be appropriately realized by any hardware, software, or a combination of both. For example, the present invention can be applied to a program causing a computer to execute the above-described processing steps (processing procedures), a computer-readable recording medium (non-temporary recording medium) on which such a program is recorded, or a computer on which such a program can be installed.

As described above, according to the present embodiment, the elapsed date and time from the time of imaging is calculated, and the image processing is performed based on the length of the calculated elapsed date and time from among the plurality of kinds of image processing that change according to the length of the elapsed date and time. Therefore, it is possible to perform the image processing that changes over time on the captured image.

<Example of Image Processing of Change over Time>

Next, the image processing of the change over time performed by the image processing unit 100D will be described. Various aspects are adopted for the image processing of the change over time performed by the image processing unit 100D. A specific example of the image processing of the change over time will be described below.

First Example

In a first example, the image processing unit 100D changes an overall color of the captured image to be processed according to the length of the elapsed date and time. For example, the image processing unit 100D changes the overall color of the captured image by lightening, darkening, or discoloring it according to the length of the elapsed date and time.

FIG. 9 is a diagram showing image processing in which an overall color of a captured image changes over time.

Reference numeral 201 denotes a captured image P1 in a case where the elapsed date and time is T1, reference numeral 203 denotes a captured image P1 in a case where the elapsed date and time is T2, and reference numeral 205 denotes a captured image P1 in a case where the elapsed date and time is T3. The length of the elapsed date and time is T1<T2<T3.

As shown in FIG. 9, the image processing unit 100D performs image processing so as to change the overall color of the captured image according to the length of the elapsed date and time. Specifically, the color (for example, sepia color) of the entire image is gradually darkened in the order of the captured image P1 of reference numeral 201, the captured image P1 of reference numeral 203, and the captured image P1 of reference numeral 205. In this way, the captured image P1 can be changed over time by performing image processing that changes the overall color of the captured image according to the elapsed date and time.

Second Example

In a second example, the image processing unit 100D changes a color of a subject of a part of the captured image to be processed according to the length of the elapsed date and time. For example, the image processing unit 100D changes the color of a background of the captured image to be processed by lightening, darkening, or discoloring it according to the length of the elapsed date and time.

Figure 10:
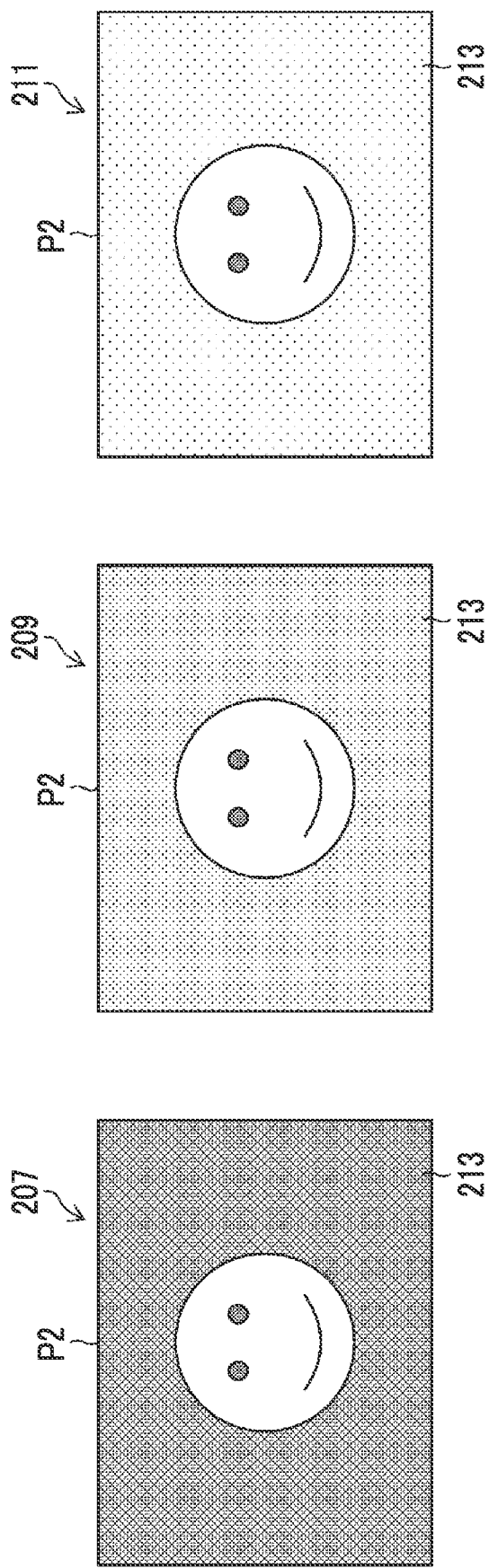
FIG. 10 is a diagram showing image processing in which a color of a subject of a part of a captured image changes over time.

FIG. 10 is a diagram showing image processing in which a color of a subject of a part of a captured image changes over time.

Reference numeral 207 denotes a captured image P2 in a case where the elapsed date and time is T1, reference numeral 209 denotes a captured image P2 in a case where the elapsed date and time is T2, and reference numeral 211 denotes a captured image P2 in a case where the elapsed date and time is T3.

As shown in FIG. 10, the image processing unit 100D performs image processing that gradually lightens the color of a background 213 of the captured image P2 according to the length of the elapsed date and time. Specifically, the color of the background 213 is gradually lightened in the order of the captured image P2 of reference numeral 207, the captured image P2 of reference numeral 209, and the captured image P2 of reference numeral 211. In this way, the captured image P2 can be changed over time by lightening the color of the background 213 according to the elapsed date and time.

Third Example

In a third example, the image processing unit 100D changes a color or a hue of a part of the captured image to be processed according to the length of the elapsed date and time. Here, the color of the part indicates the same color in the captured image, and the hue of the part indicates the same hue in the captured image. For example, the same color is a color having the same RGB signal value, and for example, the same hue is a hue belonging to the same group in a case where a hue circle is divided into six equal parts.

FIG. 11 is a diagram showing image processing in which the same color or hue of a captured image changes over time.

Reference numeral 215 denotes a captured image P3 in a case where the elapsed date and time is T1, reference numeral 217 denotes a captured image P3 in a case where the elapsed date and time is T2, and reference numeral 219 denotes a captured image P3 in a case where the elapsed date and time is T3. A leaf 221 of the captured image P3 has the same color.

As shown in FIG. 11, the image processing unit 100D performs image processing that changes the color of the leaf 221 according to the length of the elapsed date and time. Specifically, the color of the leaf 221 is gradually darkened in the order of the captured image P3 of reference numeral 215, the captured image P3 of reference numeral 217, and the captured image P3 of reference numeral 219. In this way, the captured image P3 can be changed over time by changing the color of the leaf 221 according to the elapsed date and time.

Fourth Example

In a fourth example, the image processing unit 100D changes a blurriness condition of a region of a part of the captured image to be processed according to the length of the elapsed date and time. For example, the image processing unit 100D changes the blurriness condition of a foreground or a background of a person in the captured image according to the length of the elapsed date and time. In this way, a depth of field of the captured image can be changed in a pseudo manner by changing the blurriness condition of the foreground or the background of the captured image. The image processing unit 100D detects a part of a region where the blurriness condition is changed or a region other than a part of a region where the blurriness condition is changed, and performs blurring processing. For example, the image processing unit 100D detects a region of a person (face) and performs blurring processing on a region (for example, a background) other than the detected region of the person.

FIG. 12 is a diagram showing image processing in which a blurriness condition of a background of a captured image changes over time.

Reference numeral 223 denotes a captured image P4 in a case where the elapsed date and time is T1, reference numeral 225 denotes a captured image P4 in a case where the elapsed date and time is T2, and reference numeral 227 denotes a captured image P4 in a case where the elapsed date and time is T3. The captured image P4 has a person 229 as a main subject and a mountain 231 as a background.

In a case of the elapsed date and time T1 (reference numeral 223), the captured image P4 is not changed by the image processing, and a region of the mountain 231 is not blurred. In a case of the elapsed date and time T2 (reference numeral 225), the person 229 is in focus, but the mountain 231 which is the background is blurred by the image processing. In the figure, the blurriness is indicated by double lines, and a size of an interval between the double lines indicates a size of the blurriness condition. In a case of the elapsed date and time T3 (reference numeral 227), the person 229 is in focus, but the mountain 231 which is the background is blurred by the image processing. In addition, in a case of the elapsed date and time T3 (reference numeral 227), image processing is performed such that the blurriness condition is larger than that of the elapsed date and time T2. Here, the blurriness condition means a degree of blurriness, and can be adjusted from a small blurriness condition to a large blurriness condition by image processing. In this way, in a case where the blurriness condition of the mountain 231 which is the background of the captured image P4 is increased according to the elapsed date and time, a depth of field of the captured image P4 can be made shallow in a pseudo manner, and the captured image P4 can be changed over time.

Fifth Example

In a fifth example, the image processing unit 100D changes a decorative image added to the captured image to be processed according to the elapsed date and time. Here, the decorative image is an image added to the captured image by image processing, and includes, for example, cracks, cinema-like vertical stripes, and stains.

FIG. 13 is a diagram showing image processing in which a decorative image added to a captured image changes over time.

Reference numeral 235 denotes a captured image P5 in a case where the elapsed date and time is T1, reference numeral 237 denotes a captured image P5 in a case where the elapsed date and time is T2, and reference numeral 239 denotes a captured image P5 in a case where the elapsed date and time is T3.

In a case of the elapsed date and time T1 (reference numeral 235), a crack 241 which is a decorative image has not yet been added to the captured image P5. In a case of the elapsed date and time T2 (reference numeral 237), the crack 241 is added to the captured image P5 by image processing. In a case of the elapsed date and time T3 (reference numeral 239), the crack 241 is added to the captured image P5 by image processing.

In a case shown in FIG. 13, the crack 241 changes from the elapsed date and time T2 (reference numeral 237) to the elapsed date and time T3 (reference numeral 239). Specifically, from the elapsed date and time T2 (reference numeral 237) to the elapsed date and time T3 (reference numeral 239), the cracks 241 become longer or the number of the cracks 241 increases. In this way, the captured image P5 can be changed over time by changing the crack 241 added to the captured image P5 according to the elapsed date and time.

Although the specific example of the image processing of the change over time performed by the image processing unit 100D has been described above, the image processing of the change over time performed by the image processing unit 100D is not limited to the specific example described above.

Others

In the present embodiment, the aspect of changing the image processing according to the elapsed date and time from the time of imaging the captured image has been described, but there are other kinds of processing that make a viewer interested in the image. Other examples will be described below.

[Processing Using Sound]

Image processing can be performed on a captured image by using sound associated with an imaging environment or the captured image. The digital camera 10 including a printer comprises the microphone 92, and can collect the sound of the imaging environment. Therefore, the sound of the imaging environment is collected by the microphone 92, and the camera control unit 100 stores the input sound of the imaging environment in the memory 72 together with the captured image. The image processing unit 100D uses the sound of the imaging environment stored in the memory 72 to perform image processing on the captured image.

Figure 14:
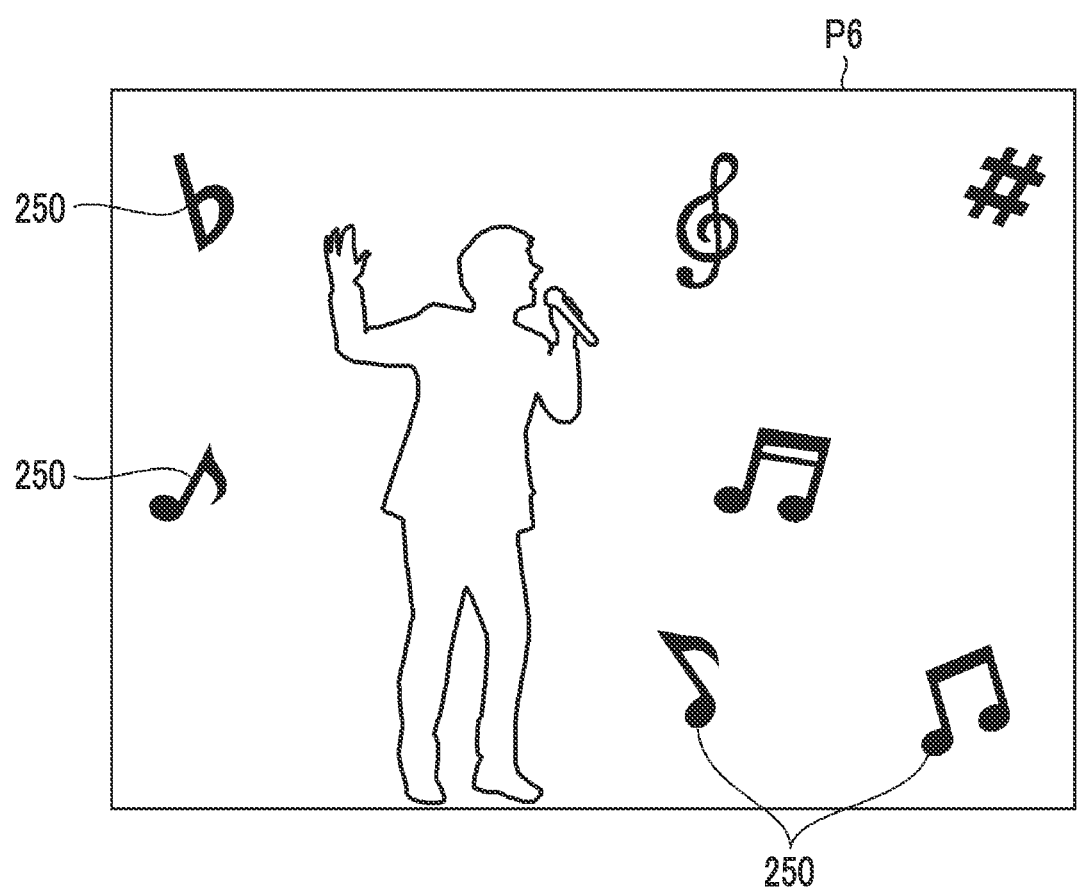
FIG. 14 is a diagram showing an example of image processing using sound of an imaging environment.

FIG. 14 is a diagram showing an example of image processing using the sound of the imaging environment, and is a diagram showing an image captured at a concert hall.

A captured image P6 is an image captured at a concert hall. For example, the sound of the concert hall is collected by the microphone 92, and image processing is added to the captured image. In the captured image P6, a musical note 250 is added to the captured image P6 by recognizing the concert hall by collecting the sound with the microphone 92. In addition, the image processing unit 100D performs soft image processing in a case where the sound of the imaging environment of a classical concert is collected, and performs image processing with strong edge enhancement and contrast in a case where the sound of the imaging environment of a heavy or hard concert is collected. The image processing unit 100D performs image processing for adding noise to the captured image in a case where the sound of a crowd is collected as the sound of the imaging environment.

[Processing using Information on Imaging Location]

Image processing according to the imaging location is performed on a captured image, and information associated with the captured image is added by using the information on an imaging location. The digital camera 10 including a printer has a global positioning system (GPS) function to detect the imaging location and to perform various kinds of processing on the captured image according to the imaging location. For example, in a case of imaging at a concert hall, the image processing unit 100D performs image processing with a live feeling on the captured image.

Figure 15:
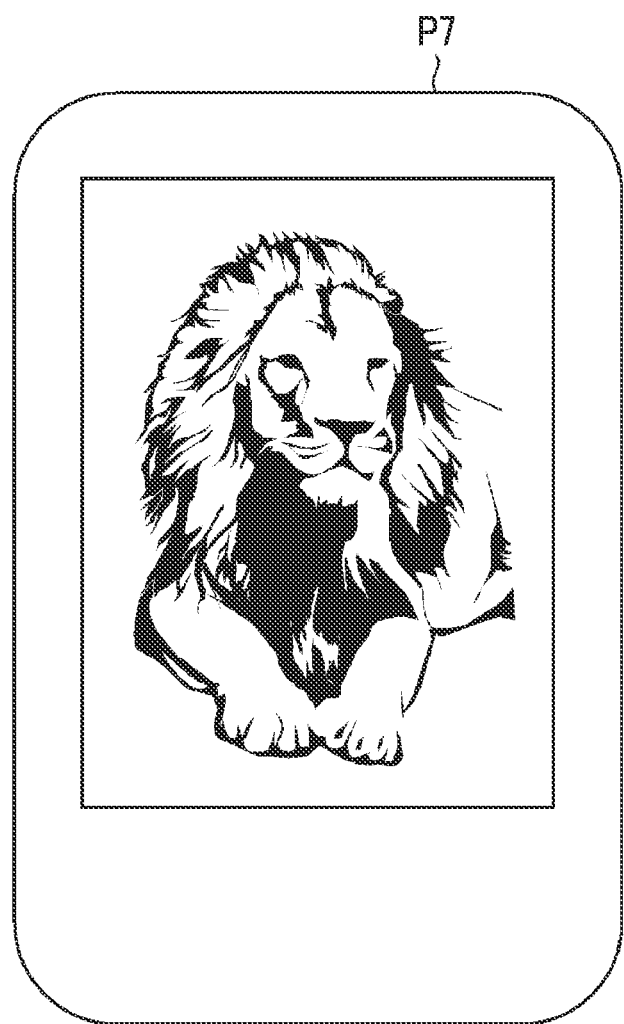
FIG. 15 is a diagram showing an example of processing using information on an imaging location.

FIG. 15 is a diagram showing an example of processing using the information of the imaging location, and is a diagram showing a captured image of a lion.

A captured image P7 is a captured image of a lion in front of a lion cage at a zoo. In a case where the digital camera 10 including a printer has a GPS function, it is detected that the captured image P7 is taken in front of the lion cage of the zoo by the GPS function. Then, the lion's bark is stored in the memory 72 together with the captured image P7, and the description (voice or character) of the lion is stored together with the captured image P7.

[Processing Using Emotion]

The user can input his or her own emotion and perform image processing according to the input emotion on a captured image. For example, an emotion setting screen is displayed on the display 28 of the digital camera 10 including a printer, and the user inputs his or her own emotion via the emotion setting screen. The image processing unit 100D performs image processing on the captured image according to the input emotion.

Figure 16:
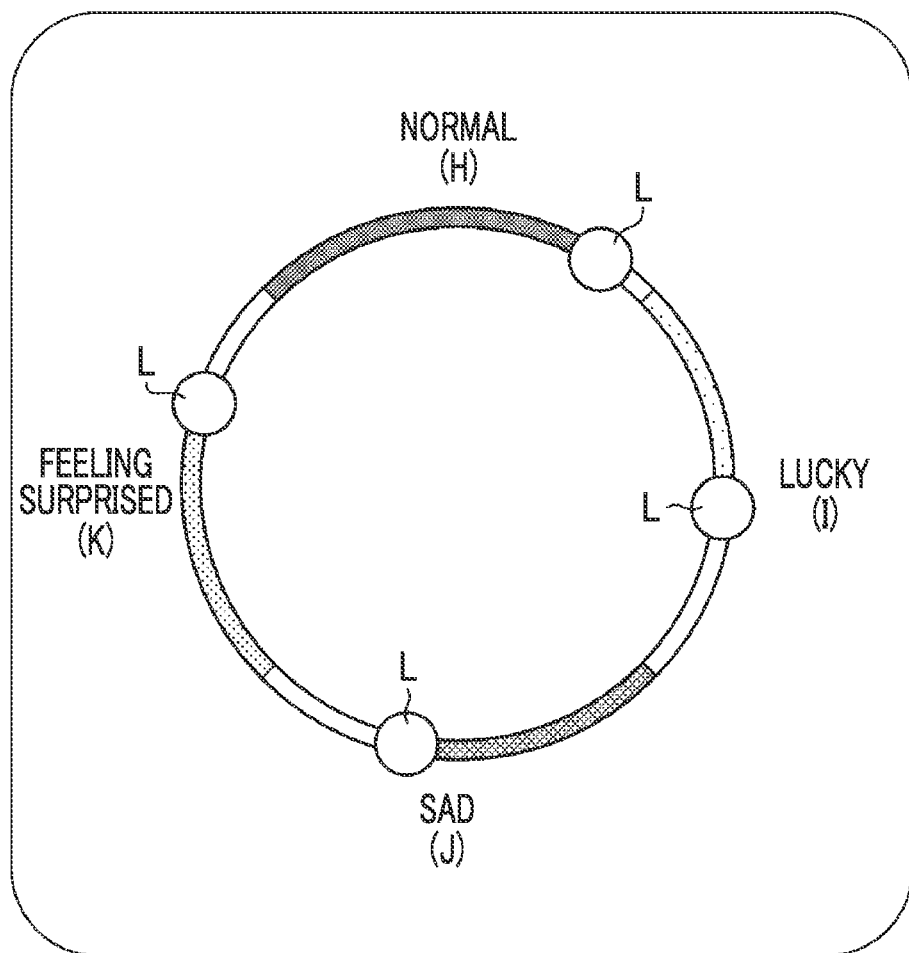
FIG. 16 is a diagram showing an example of an emotion setting screen.

FIG. 16 is a diagram showing an example of an emotion setting screen displayed on the display 28 of the digital camera 10 including a printer. The emotion setting screen shown in FIG. 16 is circular, and shows four emotions (normal (H), lucky (I), sad (J), and feeling surprised (K)). The user inputs the emotions by operating each lever L on the emotion setting screen. The image processing unit 100D performs image processing on the captured image according to the input emotion.

Figure 17:
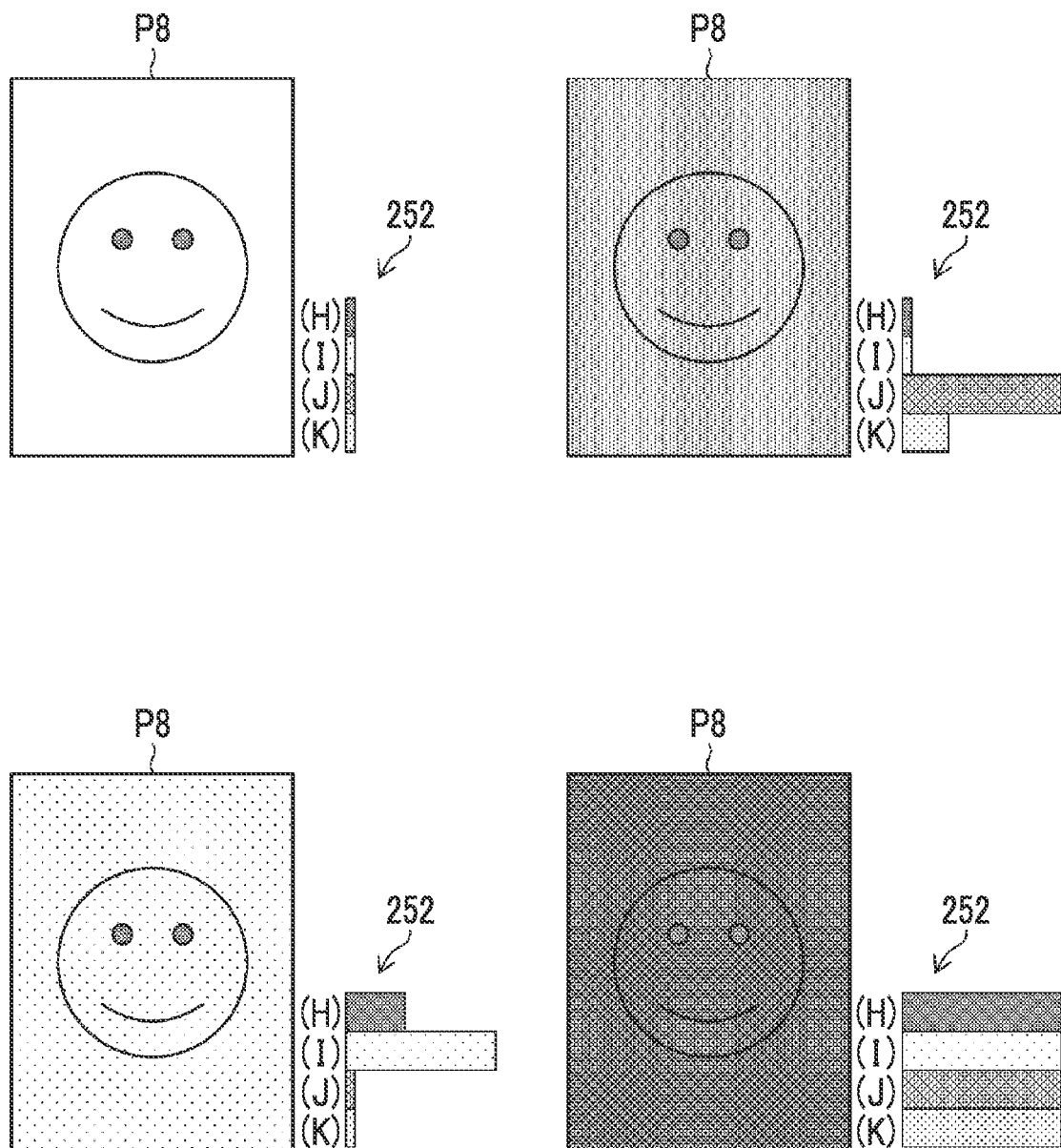
FIG. 17 is a diagram showing an example of image processing according to an emotion.

FIG. 17 is a diagram showing an example of image processing according to an emotion.

As shown in FIG. 17, a captured image P8 is subjected to image processing according to the emotion input by the user on the emotion setting screen (FIG. 16). In FIG. 17, an emotion input value display 252 on the emotion setting screen is also displayed together with the captured image P8.

Although the examples of the present invention have been described above, the present invention is not limited to the above-described embodiment, and it is needless to say that various modifications can be made without departing from the spirit of the present invention.

EXPLANATION OF REFERENCES

10: digital camera including printer
12: camera body
14: imaging lens
16: release button
18: sound recording button
20: strobe light emitting window
22*a*: power button
22*b*: menu button
22*c*: OK button
22*d*: mode switching button
24: microphone hole
26: speaker hole
28: display
30: film lid cover
32*a*: Joystick
32*b*: print button
32*c*: playback button
32*d*: cancel button
34: film discharge port
42: instant film
42*a*: exposure surface
42*b*: observation surface
42*c*: exposure region
42*d*: pod portion
42*e*: development treatment liquid pod
42*f*: trap portion
42*g*: absorbing material
42*h*: observation region
42*i*: frame
52: film feeding mechanism
54: film transporting mechanism
56: print head
62: lens drive unit
64: image sensor
66: image sensor drive unit
68: analog signal processing unit
70: digital signal processing unit
72: memory
74: memory controller
76: display controller
78: communication unit
80: antenna
82: film feeding drive unit
84: film transporting drive unit
86: head drive unit
88: strobe
90: strobe light emission control unit
92: microphone
94: speaker
96: voice signal processing unit
97: timepiece unit
98: operation unit
100: camera control unit
100A: image acquisition unit
100B: date and time information acquisition unit
100C: elapsed date and time calculation unit
100D: image processing unit
100E: display control unit
100F: printing control unit
101: image processing device

What is claimed is:

1. An image processing device comprising:
a processor configured to function as
a date and time information acquisition unit that acquires first date and time information indicating a time of imaging and acquires second date and time information indicating a date and time when captured image is acquired from a storage unit;
an elapsed date and time calculation unit that calculates an elapsed date and time from the time of imaging by making a comparison between the first date and time information and the second date and time information acquired by the date and time information acquisition unit; and
an image processing unit that selects image processing based on a length of the elapsed date and time from among a plurality of kinds of image processing that change according to the length of the elapsed date and time and performs the selected image processing on the captured image to be processed;
wherein the image processing unit acquires information related to the captured image to be processed and changes the plurality of kinds of image processing that change according to the length of the elapsed date and time in accordance with the information related to the captured image to be processed.

2. The image processing device according to claim 1, wherein the information related to the captured image to be processed is information of image mode set on the captured image to be processed.

3. The image processing device according to claim 1, wherein the date and time information acquisition unit acquires the first date and time information from first captured image and the second date and time information from second captured image, the imaging processing unit performs the image processing on the second captured image as the captured image to be processed.

4. The image processing device according to claim 1, wherein the processor is further configured to function as a display control unit that causes a display unit to display the captured image to be processed on which the image processing is performed by the image processing unit.

5. The image processing device according to claim 1, wherein the processor is further function as
a printing control unit that causes a printing unit to print the captured image to be processed on which the image processing is performed by the image processing unit.

6. The image processing device according to claim 1, wherein the captured image to be processed on which the image processing is performed by the image processing unit and the captured image to be processed before the image processing is performed by the image processing unit are stored in the memory.

7. The image processing device according to claim 1, wherein the captured image to be processed on which the image processing is performed by the image processing unit is not stored in the memory.

8. The image processing device according to claim 1, wherein the processor is further configured to function as
a relationship input unit that receives input of a correspondence on a time base between the plurality of kinds of image processing and the length of the elapsed date and time.

9. The image processing device according to claim 1, wherein the image processing unit changes an overall color of the captured image to be processed according to the length of the elapsed date and time.

10. The image processing device according to claim 1, wherein the image processing unit changes a color of a subject of a part of the captured image to be processed according to the length of the elapsed date and time.

11. The image processing device according to claim 10, wherein the image processing unit lightens a color of a background of the captured image to be processed according to the length of the elapsed date and time.

12. The image processing device according to claim 1, wherein the image processing unit changes a color or a hue of a part of the captured image to be processed according to the length of the elapsed date and time.

13. The image processing device according to claim 1, wherein the image processing unit changes a blurriness condition of a region of a part of the captured image to be processed according to the length of the elapsed date and time.

14. The image processing device according to claim 13, wherein the image processing unit changes the blurriness condition of a foreground or a background of a person in the captured image according to the length of the elapsed date and time.

15. The image processing device according to claim 1, wherein the image processing unit changes a decorative image added to the captured image to be processed according to the elapsed date and time.

16. The image processing device according to claim 1, wherein the image processing unit acquires sound of imaging environment in which the captured image is imaged and performs an image process by using the sound of imaging environment.

17. The image processing device according to claim 1, wherein the image processing unit acquires information of an imaging location in which the captured image is imaged and performs an image process based on the information of the imaging location.

18. The image processing device according to claim 1, wherein the image processing unit acquires an emotion that a user input and performs an image process based on the emotion.

19. An image processing method comprising:
acquiring first date and time information indicating a time of imaging and acquires second date and time information indicating a date and time when captured image is acquired from a storage unit;
calculating an elapsed date and time from the time of imaging by making a comparison between the first date and time information and the second date and time information acquired by the date and time information acquisition unit; and
selecting image processing based on a length of the elapsed date and time from among a plurality of kinds of image processing that change according to the length of the elapsed date and time and performs the selected image processing on the captured image to be processed;
wherein the image processing method further comprises acquiring information related to the captured image to be processed and changing the plurality of kinds of image processing that change according to the length of the elapsed date and time in accordance with the information related to the captured image to be processed.

20. A non-transitory computer readable recording medium storing a program causing a computer to execute an image processing process comprising:
a step of acquiring first date and time information indicating a time of imaging and acquires second date and time information indicating a date and time when captured image is acquired from a storage unit;
a step of calculating an elapsed date and time from the time of imaging by making a comparison between the first date and time information and the second date and time information acquired by the date and time information acquisition unit; and
a step of selecting image processing based on a length of the elapsed date and time from among a plurality of kinds of image processing that change according to the length of the elapsed date and time and performs the selected image processing on the captured image to be processed;
wherein the image processing process further comprises acquiring information related to the captured image to be processed and changing the plurality of kinds of image processing that change according to the length of the elapsed date and time in accordance with the accessory information of image mode set on the captured image to be processed.

* * * * *